(No Model.)
A. HAID.
SECONDARY BATTERY.
No. 294,464. Patented Mar. 4, 1884.
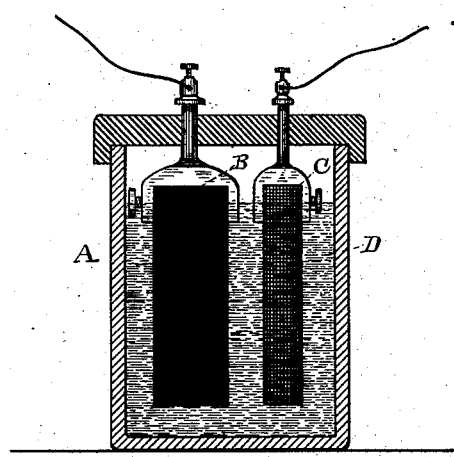
ATTEST:
E. C. Rowland
H. W. Seely
INVENTOR:
Alfred Haid,
By Richd. N. Dyer
Atty.

UNITED STATES PATENT OFFICE.

ALFRED HAID, OF RAHWAY, ASSIGNOR, BY DIRECT AND MESNE ASSIGN-
MENTS, TO HAIDS ELECTRICAL STORAGE COMPANY, OF NEWARK,
NEW JERSEY.

SECONDARY BATTERY.

SPECIFICATION forming part of Letters Patent No. 294,464, dated March 4, 1884.

Application filed February 17, 1883. (No model.)

*To all whom it may concern:*

Be it known that I, ALFRED HAID, a subject of the Emperor of Germany, and a resident of Rahway, in the county of Union and State of New Jersey, have invented certain new and useful Improvements in Batteries, of which the following is a specification, such batteries being distinguished from what are ordinarily termed "secondary batteries," from the fact that in the process of charging an electro-positive metal is deposited upon the negative electrode, which, in the action of the battery, becomes the positive electrode.

My invention relates more particularly to batteries which, while incapable themselves of developing electrical energy, may be brought into an active condition by the passage through them of a current from an external source.

The main objects of my invention are to produce a battery of this kind more constant in its action than those heretofore used, and in other respects to improve the character of the battery, whereby it is rendered more lasting and serviceable for general use.

My improvements consist, chiefly, in the employment, in combination with the electrodes of a battery, whether they be capable themselves of developing a current or not, of a solution containing, in conjunction with an acid, a metallic salt and a compound which, by the decomposition of the solution by the action of the current, will be deposited upon the electrodes—the one on the negative electrode in the condition of an active or electro-positive metal, the other on the positive electrode as a depolarizing agent. For this purpose I employ in a suitable cell a carbon plate as one electrode and an amalgamated zinc or a cadmium plate as the other, and as the liquid a solution in water of sulphuric acid, sulphate of zinc, and sulphate of manganese. By passing a current through this battery from the carbon to the metal pole, metallic zinc will be deposited upon the surface of the metal plate, while a high oxide of manganese will be formed from the sulphate of manganese, and attach itself to the carbon plate both on its surface and in its pores. In this way the battery is brought into a condition capable of giving off a current. By connecting its poles the zinc is dissolved by the sulphuric acid in the solution becoming sulphate of zinc, while the peroxide of manganese, which acts as a depolarizing agent, is reduced, becoming again sulphate of manganese.

When a zinc plate is used, it is obvious that, for a time at least, the battery is a true galvanic battery; but from the character of the other elements employed it is comparatively feeble and rapidly polarized. When submitted to the action of a current, however, in the manner described, it becomes exceedingly active and constant, retaining its charge for a long time.

In lieu of the zinc plate, as intimated above, I may use some other metal that will take readily a deposit of metallic zinc, cadmium or amalgamated lead being preferred for this.

In the solution I may also use other acids than sulphuric and other compounds of zinc than the sulphate, though this I prefer. So, also, for the compound for forming the depolarizing agent I may use sulphate of chromium, or a salt of any other metal which will yield by electrolytic action a depolarizing agent that attaches itself to the positive electrode.

The drawing is a conventional representation of a battery in section.

*a* is the cell, B the carbon, and C the metallic plate. D is the solution.

What I claim is—

1. In a battery, the combination, with the electrodes, of an acid solution containing a metallic salt—such as sulphate of zinc—and a metallic salt capable of forming under electrolytic action a depolarizing substance or compound on the positive electrode, substantially as described.

2. In a battery, the combination, with a carbon and metal electrode, of an acid solution containing a salt of a metal electro-positive to carbon and a metallic salt capable of forming under electrolytic action a depolarizing substance or compound on the positive electrode.

3. In a battery, the combination of a carbon plate, an amalgamated-zinc plate or its equivalent, and a solution containing sulphuric acid, sulphate of zinc, and sulphate of manganese or its equivalent, substantially as described.

This specification signed and witnessed this 13th day of February, 1883.

ALFRED HAID.

Witnesses:
WM. H. MEADOWCROFT,
H. W. SEELY.